United States Patent Office 3,733,398
Patented May 15, 1973

3,733,398
DETERMINING AND REVERSING ANTICOMPLEMENTARY ACTIVITY IN COMPLEMENT FIXATION TEST FOR AUSTRALIA ANTIGEN
Nahum Raphael Shulman, Kensington, Md., assignor to the United States of America as represented by the Secretary of the Department of Health, Education, and Welfare
Filed July 17, 1970, Ser. No. 55,725
Int. Cl. C12k 1/00; G01n 31/00, 33/16
U.S. Cl. 424—12     4 Claims

ABSTRACT OF THE DISCLOSURE

Antigen or antibody is added to an appropriate biologic material to react wtih hepatitis associated antibody or antigen, respectively, if present. The reaction mixture is incubated with complement to fix the latter. Titration of non-fixed complement with standardized cells reveals presence or absence and amount of hepatitis associated antibodies or antigens in the substance tested, thereby revealing the presence of disease or immunity to the disease if substances from an individual are tested, or the presence of virus than can transmit disease or antibody that may neutralize virus in biological materials that are tested. In such test procedure, anticomplementary activity may be detected. It can be reversed by adding to the anticomplementary biologic material a large excess of the antigen or the antibody.

BACKGROUND OF THE INVENTION

Figure 1:
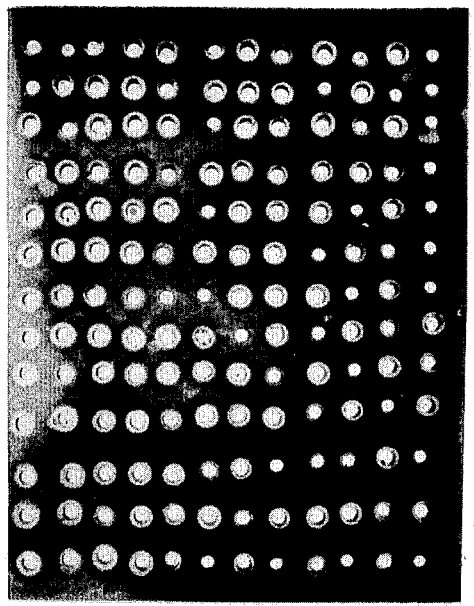

Infectious or viral hepatitis, also known as serum hepatitis, acute infectious hepatitis or catarrhal jaundice is a relatively common disease. The disease results from an infection of the liver by the infectious hepatitis (IH) or serum hepatitis (SH) viruses which are filterable viruses. It is transmitted to others usually through an intermediate carrier such as food, water, plasma, any blood products, etc.

The disease is sometimes difficult to diagnose and there is no specific treatment. Hepatitis poses a serious problem in public health, and an especially important problem in detecting blood donors who may transmit the disease. The problem is further complicated by the fact that as many as 5% of reported cases become chronically ill and another 2% become cirrhotic. Therefore, the number of patients suffering from hepatitis increases every year.

The hepatitis producing viral strains are found in the stool or circulatory fluids of individuals suffering from the disease. Presently known methods for detecting viral hepatitis depend principally upon the detection of virus products in the body fluids, particularly blood. Most of these methods are time-consuming and burdensome, and all are relatively insensitive with respect to the amount of virus that can transmit disease.

It has been proposed to utilize the neutralizing effect of immune serum, i.e., the serum of an individual who has recovered from viral hepatitis and contains antibodies specific against the disease to diagnose hepatitis. The most commonly employed method of ascertaining the presence of hepatitis is the so-called agar-gel precipitation test wherein an antibody and the sample are added to agar-gel and diffuse to form a precipitate of antibody-antigen complex if the hepatitis-associated antigen is present in the sample. This test is, however, not very sensitive, requires long periods of time to react, and does not permit accurate quantitative determination of the antigen present in the sample.

It is an object of the present invention to provide a rapid, efficient and accurate method for diagnosing viral hepatitis or detecting the presence of hepatitis virus or products of the virus in biological material. Some variations of the method are capable of being carried out by relatively unskilled individuals with a minimum of training or of being automated with appropriate instrumentation.

SUMMARY OF THE INVENTION

Briefly, the method of the present invention involves adding a biologic material such as a body fluid, e.g., blood or plasma, saliva or stool extract, or similar material, e.g., tissue cells or extracts, plasma proteins, or tissue culture filtrate, to the appropriate known antibody which will react with hepatitis-associated antigen to detect the presence of antigen or involves adding similar substances to an appropriate known antigen to detect antibody. The reaction mixture is incubated with a predetermined amount of complement to fix the latter. By titrating the amount of remaining non-fixed complement by means of incubation with a standardized cell solution the amount of hepatitis-associated antigen or antibody present in the body fluid or substance tested can be easily determined.

It is a further feature of the invention that "anticomplementary activity," or the unexplained loss or fixation of complement by a body fluid alone without the addition of antibody or antigen can be reversed by the addition to the body fluid of a large excess of specific antibody or antigen to detect hepatitis antigen or antibody that would otherwise be obscure.

DETAILED DESCRIPTION OF THE INVENTION

Antigens and antibodies have been found to be present in the biologic material of individuals suffering from the various forms of viral hepatitis. The present invention is predicated on the discovery that complement fixation techniques may be utilized to detect the presence of these agents in the body fluids and hence the disease of hepatitis in the individual.

The hepatitis-associated antibodies are found chiefly in blood plasma as are the antigens, but antibody and antigen may be present in virtually all of the body fluids and organs, e.g., urine, saliva, liver, etc. The method of the present invention is applicable to the detection of these agents in all biologic materials such as body fluids, tissues, etc. It is preferred, however, to utilize the method of the invention in connection with the diagnosis of hepatitis in blood, inasmuch as the antibody and antigen are readily available therein. It is especially preferred to employ the blood serum as the test substance since most of the hepatitis-associated antigens and antibodies have been found therein.

The method of the invention may be employed to diagnose the disease of hepatitis itself, by quantitatively or qualitatively measuring the amount of hepatitis-associated antigen present in the biologic material. Alternatively, the method may be employed to assess immunity of an individual to the disease by quantitatively or qualitatively measuring the amount of hepatitis-associated antibody present in blood or other biologic material.

To measure antigen, a predetermined amount of hepatitis-associated antibody is added to a sample of biologic material of predetermined size. The added antibody will interact with any hepatitis-associated antigen present to produce an antibody-antigen complex. To the sample is added a predetermined quantity of complement and the entire mixture is incubated for a period of time sufficient to allow fixation of the complement by the antibody-antigen complex. The amount of non-fixed complement remaining after incubation may then be determined. This determination will enable the calculation of the amount of complement fixed and, hence, the amount of hepatitis-associated antigen present in the original sample. Since the presence of antigen in the sample is correlated with hepatitis, the diagnosis of viral hepatitis or the ability of the individual tested to transmit the disease may be accurately and precisely determined.

By adding a predetermined quantity of hepatitis-associated antigen to the body-fluid sample and duplicating the remainder of the above-described process, the fact that the individual was previously exposed to hepatitis may be accurately determined and the likelihood of immunity predicted.

It is to be understood that the antibody-antigen complex may be formed prior to the addition thereto of complement or the antibody or antigen body fluid sample and complement may be admixed in any order, whereupon formation of the complex and subsequent fixation of the complement will occur either concurrently or sequentially.

It is further to be understood that by the term "incubation" is meant subjecting the mixture of antigen, antibody or complex and complement to conditions which will result in the formation of the antibody-antigen complex and/or fixation of the complement by the complex. Generally, these conditions merely comprise intimately admixing the components of the mixture and allowing them to stand. The temperature of incubation may range from about 4° C. to about 40° C. Generally, the mixture is allowed to incubate for periods of time ranging from about 30 minutes to about one day.

Obviously, the length of time required in any particular application will depend upon a variety of factors, i.e., size of sample, amount of antigen present, temperature, etc. Analysis of a typical sample showed, for example, that complex formation and complement fixation was 85% complete within 15 minutes at 37° C.; 95% complete within 30 minutes at 37° C.; and not significantly increased by additional incubation at 5° C. Generally, incubation at most temperatures in the above-defined range overnight will result in complete complex formation and complement fixation.

The antibodies employed in the method of the invention may be obtained from a variety of sources. For example, they may be obtained from the blood of a patient who has recovered from or is immune to hepatitis. They may also be derived from animals, e.g., chimpanzees, guinea pigs, rabbits. It is to be understood, however, that the method of the present invention is not limited to the employment of antibodies derived from a particular source. The antibodies may be employed as whole serum over a wide range of dilution in saline solutions or buffers or they may be utilized in purified form, separated from whole serum by any of a number of physicochemical techniques used to obtain purified gamma globulin, e.g., salt precipitation, Sephadex gel filtration, or diethylaminoethyl cellulose elution. The antigen may be derived from the sera of individuals suffering from hepatitis or from asymptomatic carriers of the antigen. The antigen may be employed as whole serum over wide ranges of dilutions or in purified form after separation by filtration, electrophoresis or centrifugal sedimentation techniques. Various chemically precipitated fractions of blood may also be utilized as sources of antigen.

Complement from any animal source may be employed for fixation. For example, it has been found that human and guinea pig complement were fixed equally. In addition, purified complement components (i.e., $C_2$ $C_3$ or $C_4$) may be employed in lieu of "whole" complement. Thus, it will be understood that any reference in the specification and claims to "complement" will be taken as a reference to whole complement or complement components.

The various reagents for the methods of the invention, i.e., antigen, antibody, complement, antigen-antibody complex, may be utilized immediately, stored frozen indefinitely or lyophilized for indefinite storage. For example, it has been found that antigen stored for as long as 15 years at −20° C. or heated at 56° C. for one hour gave results essentially the same as antigen in fresh serum.

It is to be understood that the term, "biologic material," as used in the specification and claims, is intended to include all body fluids, tissues, body components, etc., which contain the antibody or antigen for which the test is designed, e.g., blood, serum, urine, organ or stool extracts, tissue culture filtrates, purified proteins, cell suspensions, etc., the purified antibodies and antigens themselves, and dilutions and fractions thereof. Generally, the biologic material should be in an essentially fluid condition, i.e., liquid, suspension, finely divided etc., in order to enable a quick and thorough admixture with the added reagents.

The relative sizes of the biologic material samples, antigen and antibody samples, and complement samples may obviously vary over a wide range depending upon the amount of each reagent available, the degree of sensitivity desired, etc. Furthermore, as noted above, the various reagents may be used over a wide range of dilutions. The only essential requirements are that there be sufficient amounts of antibody and antigen to interact to form a complex and that there be sufficient complement or complement components present to measure prior to fixation by the antigen-antibody complex.

As mentioned above, the method of the present invention enables a quantitative determination of the antigen or antibody present in substances tested. The amount of complement or complement component remaining after fixation by the antigen-antibody complex may vary from none to any amount measurable quantitatively or qualitatively.

The quantitative determination may be made by adding the non-fixed complement to a predetermined amount of sensitized red blood cells and measuring the degree of hemolysis of the cells. This is most advantageously accomplished colorimetrically by observing the amount of hemoglobin produced by the hemolyzing reaction. The colorimetric observation may be made visually or spectrophotometrically. As will be apparent to those skilled in the art, it is a simple matter to calculate the amount of antigen or antibody present in the original body-fluid sample knowing the amount of antibody or antigen added, the amount of complement added, and the amounts of fixed and non-fixed complement remaining following incubation.

The sensitized cells are prepared according to techniques well known in the art. For example, red blood cells are coated with a complement-fixing antibody specific for them. The standard reagents, most commonly employed, are sheep red blood cells, sensitized with rabbit antibody; however, any antigen-antibody system which fixes complement and lends itself to standardization may be employed.

EXAMPLE 1

A standard curve for titering complement was prepared in the following manner.

Sheep red blood cells were washed free of plasma and buffy coat by suspending them in isotonic saline and spinning down in a centrifuge. This operation was repeated on the same cells 4 times. A 5% suspension of the cells (vol./vol.) in veronal buffer (pH=7.3) was prepared. The optical density of the suspension read 0.750±0.010 when measured in a spectrophotometer at 550 m$\mu$ after hemolyzing 0.5 ml. of the suspension in 7.0 ml. of distilled water.

The cells were then sensitized by coating with a specific antibody which had been produced in a rabbit. An amount of antibody was employed which was equivalent to 4 times the amount necessary to completely hemolyze the cells in the presence of excess complement.

Guinea pig serum was employed as the source of complement. The serum was diluted 112-fold with veronal buffer pH 7.3. The diluted complement was added in increments of 0.05 ml. to 0.5 ml. into sufficient amounts of the indicator system (veronal buffer+sensitized cells)

in separate test tubes so as to bring the total volume in each test tube to 3.75 ml.

After incubation at 37° C. for 30 minutes, the intact red cells were sedimented by centrifugation at 3,000 r.p.m. for 5 minutes. The optical density of each of the supernatant solutions was measured at 550 mµ and plotted versus the amounts of diluted complement to yield a standard lysis curve. The 50% hemolytic unit was determined, i.e., the amount of diluted complement producing an optical density of 0.375 by lysing 50% of the red cells (midpoint). This amount of complement is defined as 1 unit. The amount of non-fixed complement in any reaction system following fixation can then be expressed by:

$$\text{units/ml. undiluted serum} \times \frac{1}{\text{midpoint}} \times \text{dilution of complement}$$

To ascertain the presence and quantity of Australia antigen (hepatitis-associated antigen or HAA) in a serum sample, varying amounts (0.04 to 40 microliters) of the serum were incubated at 37° C. in test tubes with 40 microliters of antibody, which had been demonstrated to be specific for the antigen on gel diffusion plates, along with 10 units of guinea pig complement and sufficient veronal buffer to bring the reaction mixture to 0.4 ml. volume. At the end of one hour the incubation was terminated by the addition of veronal buffer to bring the total volume to 3.0 ml. Each solution was assayed, according to the procedure described above in connection with setting up the standard curve, to ascertain the degree of lysis and amount of non-fixed complement remaining therein. The amounts of antigen present were proportional to the amount of complement fixed over a wide range of dilutions in the presence of excess antibody. Thus, the method described in this example constitutes a true quantitative method that permits calculating the amount of antigen present in the original serum samples.

EXAMPLE 2

This example describes another quantitative test for antigen which is more accurately termed a micro-quantitative technique since the final volumes of the test solutions are on the order of 0.125 ml.

The sera to be analyzed for hepatitis associated or Australia antigen were serially diluted with veronal buffered saline. One drop of each dilution along with one drop each of antibody and guinea pig serum (containing 2 complete hemolytic units) were added via dropping pipettes to small individual wells in a clear plastic sheet. The solutions were incubated at 37° C. for 1 hour for 4° C. overnight.

Following incubation, 1 drop of 1% sheep red cells coated with dilute rabbit anti-sheep red cell antibody was added to each well. The plate was sealed with a sheet of clear plastic and the contents incubated at 37° C. for 30 minutes. After sedimenting the red cells by centrifugation or gravity, the degree of lysis of the red cells in any particular well could be visually determined either by the color of the supernatant fluid or the size of the button of remaining red cells. A low degree of lysis, i.e., a larger button of red cells, indicates a greater degree of complement fixation and, consequently, a higher amount of antigen in the sample tested in the presence of excess antibody. The degree of lysis in each well was determined by visual comparison with wells containing standards representing varying degrees of hemolyzed red cells.

The indicator cells had been prepared as described above in Example 1 with the exception that a 1% suspension (vol./vol.) of the cells in veronal buffered saline was made. The cells were coated or sensitized with rabbit anti-sheep red cell antibody diluted to contain twice the amount needed to lyse sheep cells in the presence of excess complement in the micro-incubation mixture.

The results are set forth in Table 1. The degree of complement fixation is indicated in each instance by a value ranging from (−) for complete hemolysis to (4+) for the absence of hemolysis.

TABLE 1

| Antigen dilution | CF box titration at antibody dilution | | | | |
|---|---|---|---|---|---|
| | 30 | 60 | 120 | 240 | 480 |
| 1 | − | − | − | − | − |
| 2 | − | − | − | − | − |
| 4 | 2+ | − | − | − | − |
| 8 | 3+ | 1+ | − | − | − |
| 16 | 4+ | 3+ | − | − | − |
| 32 | 4+ | 4+ | 1+ | − | − |
| 64 | 4+ | 4+ | 4+ | ± | − |
| 128 | 4+ | 4+ | 4+ | 4+ | − |
| 256 | 4+ | 4+ | 4+ | 4+ | − |
| 512 | 4+ | 4+ | 4+ | 4+ | ± |
| 1,024 | 4+ | 4+ | 4+ | 4+ | ± |
| 2,048 | 3+ | 4+ | 4+ | 2+ | − |
| 4,096 | ± | ± | − | − | − |

As is apparent, the method according to the present invention is a highly quantitative and sensitive assay for hepatitis-associated antigen or the antibody against it.

EXAMPLE 3

In this example, the sensitivity of the method of the invention and that of the agar gel and electromicroscopy tests for ascertaining presence of antigen in sera were compared (Table 2). The column headed "agar gel" indicates the amount of antigen determined by the precipitation test in agar gel as carried out by B. S. Blumberg et al., JAMA 191: 541, 1965. The column headed "EM" indicates the amount of antigen determined by electron microscopy according to the method of L. F. Barker et al., J. Immunol. 102: 1529, 1969.

TABLE 2

| Antigen dilution | Optimum antibody | | | CF box titration at antibody dilution | | | | |
|---|---|---|---|---|---|---|---|---|
| | Agar gel | EM | CF units | 30 | 60 | 120 | 240 | 480 |
| 1 | 3+ | 4+ | >10 | − | − | − | − | − |
| 2 | 1+ | 3+ | >10 | − | − | − | − | − |
| 4 | − | 2+ | >10 | 2+ | − | − | − | − |
| 8 | | 1+ | >10 | 3+ | 1+ | − | − | − |
| 16 | | ± | >10 | 4+ | 3+ | − | − | − |
| 32 | | | >10 | 4+ | 4+ | 1+ | − | − |
| 64 | | | >10 | 4+ | 4+ | 4+ | ± | − |
| 128 | | | 8 | 4+ | 4+ | 4+ | 4+ | − |
| 256 | | | 4.8 | 4+ | 4+ | 4+ | 4+ | − |
| 512 | | | 2.5 | 4+ | 4+ | 4+ | 4+ | ± |
| 1024 | | | <1 | 4+ | 4+ | 4+ | 4+ | ± |
| 2048 | | | 0 | 3+ | 4+ | 4+ | 2+ | − |
| 4096 | | | | ± | ± | − | − | − |

In the complement fixation method of the present invention, the serum was analyzed according to the quantitative method of Example 1 under the column headed "CF Units," utilizing an amount of antibody that produced maximum fixation at each serum (antigen) dilution; and the micro-quantitative method of Example 2 under the columns headed "CF Box Titration at Antibody Dilution."

The reliability of the complement fixation method of the present invention was compared with the agar gel test for detecting hepatitis-associated antigen in patients (Table 3).

In the quantitative complement fixation method, an amount of antibody sufficient to fix 8 units of complement with optimum antigen concentration was incubated with the serum at dilutions of 1:8, 1:40 and 1:200 final dilutions. In the micro-quantitative method, the test was performed with one concentration of antibody and two-fold serial final dilutions of serum from 1:16 to 1:2048.

Group 1 comprised individauls in a probable common source outbreak of infectious hepatities. Group 2 comprised cases of endemic hepatitis from Ghana, on whom occasional samples were taken during acute and convalescent phases. Group 3 comprised individuals with post-transfusion hepatitis, from whom sera were collected once or twice during the acute and convalescent phases of the disease. Group 4 comprised volunteers exposed parenterally to a variety of blood products known to transmit viral hepatitis and on whom blood samples were collected at weekly intervals after exposure. Group 5 was the control and comprised normal, healthy hospital employees. Group 6 was a group of blood donors in which a high incidence of hepatitis carriers was suspected. The results are set forth in Table 3.

TABLE 3

| Group | Number of individuals | Total samples | Individuals (percent with antigen) | |
|---|---|---|---|---|
| | | | Agar gel | Complement fixation |
| 1 | (1) | 16 | 0 | 100 |
| | (2) | 45 | 7 | 45 |
| 2 | 112 | 296 | 16 | 59 |
| 3 | 24 | 38 | 8 | 54 |
| 4 | 130 | 4,000 | 62 | 98 |
| 5 | 242 | 242 | 0 | 0 |
| 6 | 372 | 372 | 2 | 4 |

[1] 8 icteric.
[2] 29 anicteric.

As is apparent, the method of the present invention is a much more reliable method for the diagnosis of hepatitis than the commonly employed prior art method of precipitation of the antigen-antibody complex in agar gel.

EXAMPLE 4

In this example, the complement fixation procedure for detecting hepatitis-associated antigen or antibody is adapted for use with reagents that can be stored for long periods of time and with equipment that permits relatively unskilled individuals with a minimum of training to carry out the tests. This example involves diffusion of complement into a gel medium as a means of assessing the amount of complement fixed by the specific antigen-antibody reaction. The supporting medium used in this instance was agarose gel, although plain agar or any similar supporting medium could be used. The indicator system for detecting complement was sensitized sheep red cells essentially as used in Examples 1 and 2 above. The antigen-antibody reaction may be carried out in the presence of complement in wells similar to those used in Example 2 or in test tubes as in Example 1. After incubation for 60 minutes at 37° C. a fixed amount of the mixture was transferred to a hole in the agar gel in which red cells were suspended. Complement remaining in the reaction mixtures diffuses into the medium and lyses the sensitized indicator cells. Hemoglobin from the lysed cells then diffuses out of the local area of the gel to leave a clear zone of lysis surrounding the hole. The size of the clear zone is proportional to the amount of complement remaining. Failure of a clear zone to develop after a reaction mixture is added to the hole indicates the absence of complement, hence the fact that complement was fixed.

The medium for assaying complement by diffusion was prepared as follows. A mixture of sheep cells sensitized as in Example 1 was mixed at 40° C. in a ratio of 1 part of a 2.5% by volume sheep cell suspension with 7.5 parts of a liquid suspension of 1% agarose by weight by veronal buffered saline at pH 7.3 employing 0.02% sodium azide by weight to prevent bacterial growth. While still liquid the mixture was spread on glass slides at a thickness of between 2 to 3 mm. When the mixture solidified at room temperature, holes 2 to 3 mm. in diameter were made in the gel as a well to hold the sample which was assayed.

To test for the hepatitis-associated antigen, varying amounts of body fluid (serum or other substances tested) were incubated with standard antibody (40 μl.) and 1 to 3–50% hemolytic units of guinea pig complement in test tubes of sufficient size to hold the incubation mixture which did not exceed .15 ml. Incubation was for 60 minutes at 37° C. or overnight at 4° C. To test the sample for antibody, a standard amount of antigen was used in place of standard antibody in the reaction mixture, and varying amounts of body fluid were added, and the test carried out exactly as the test for antigen. To measure residual complement after incubation, an aliquot (10 μl.) of reaction mixture is transferred with an automatic pipette to a hole in the agarose plate containing indicator cells. The plate is then incubated at 37° C. for 30 minutes and the area surrounding the holes are observed for lysis. The time of incubation does not significantly affect the size of the lytic area after a period of 30 minutes at 37° C. As shown in FIG. 1, the holes with no surrounding lysis contain mixtures in which most or all of the complement was fixed by the antigen-antibody reaction, indicating presence of antigen or antibody in the sample being tested, whereas holes surrounded by maximum lysis indicate no complement fixation, hence lack of antigen or antibody in the sample being tested. For clearcut readings by unskilled observers, the amount of complement added to the reaction mixture is such that almost all is fixed by any significant antigen-antibody reaction as in FIG. 1. Although degrees of lysis surrounding the holes can be interpreted semi-quantitatively to assess amounts of complement fixed, this requires more skill.

The sensitivity of this test is similar to that of Example 1. Its advantage over Example 1 is that the reagents can be prepared by a central laboratory skilled in the use of complement and supplied to laboratories in which this skill is lacking. The gel containing sensitized red cells can be stored at 4° C. for at least a week without change in reactivity. The test tubes or plastic plates containing wells in which the reaction is carried out can be prepared beforehand by the addition of antibody and complement or antigen and complement (depending on whether antigen or antibody is being sought in the sample tested) and stored in the frozen state for at least a month before use.

This example indicates the versatility of the complement fixation procedure and the ability to adapt it for use by those with little laboratory skill. By appropriate modifications the complement fixation procedure can also be adapted for machines that automatically pipette and mix reagents and perform chemical determinations based on light transmittance or spectrophotometric readings.

It has been further found that some patients develop "anticomplementary activity" in their sera during the course of hepatitis. By "anticomplementary activity" is meant the unexplained loss or fixation of complement by the serum alone without the addition thereto of antibody or antigen. Although there is no intent to be bound by any theory, it is believed that the "anticomplementary activity" is caused by circulating antigen-antibody complexes which are native to or develop naturally in the sera.

It has been found that this anticomplementary activity may be reversed by the addition to the serum of excess specific hepatitis-associated antigen and may be decreased by adding specific hepatitis-associated antibodies that demonstrate a "prozone" phenomenon well known in the field of immunology. An example of "prozone" phenomenon is in Table 1 where 3+ complement fixation occurred with antibody at 1/30 dilution and 4+ fixation occurred with antibody at 1/60 and 1/20 dilution when antigen dilution remained constant at 1/2048. It is therefore possible to determine the degree of hepatitis-associated anticomplementary activity in any particular case and compensate for its effect on the determination of complement fixation according to the method described above.

Anticomplementary activity is measured by incubating a sample with a predetermined amount of complement for a period of time sufficient to allow any anticomplementary activity to manifest itself, i.e., fix the complement or otherwise render it unavailable for fixation by conventional methods. The amount of non-fixed or stable complement remaining after incubation is then determined according to the methods described above, i.e., titration with sensitized red blood cells. A large excess of hepatitis-associated antigen or antibody is then added to a second body fluid sample identical to the first (aliquot) and the mixture incubated for a time sufficient to reverse the anticomplementary activity, i.e., usually from 1 to 4 hours at 37° C. or 4 to 16 hours at 4° C. A predetermined amount of complement is then added to the sample and the above-described complement fixation test used with the first body fluid sample is repeated. By comparing the results with those obtained previously, the precise degree of anticomplementary activity associated with hepatitis may be determined.

mixing it with 10 units of complement and incubating at 37° C. for 60 minutes, the non-fixed complement being measured as described in Example 1. In some instances the mixture of antigenic serum in anticomplementary serum was not incubated prior to measuring anticomplementary activity.

TABLE 4

| Time after exposure | Serum plus antibody | | Serum alone | Serum plus excess antigen | | | Serum plus excess antibody, incubated before CF |
|---|---|---|---|---|---|---|---|
| | Agar gel | CF titer | | Incubated before CF | Number incubated before CF | | |
| 3 | 0 | 0 | 0 | 0 | 0 | | |
| 4 | 0 | 0 | 6.0 | 0 | 4.5 | | 1.5 |
| 6 | 0 | 0 | 7.5 | 0 | 6.5 | | 2.8 |
| 8 | 0 | 40 | 2.1 | 0 | 1.8 | | — |
| 12 | + | 640 | 0 | 0 | 0 | | — |
| 16 | + | 320 | 1.5 | 0 | 0 | | — |
| 19 | 0 | 160 | 1.8 | 0 | 1.5 | | — |
| 21 | 0 | 0 | 7.5 | 0 | 6.5 | | 2.5 |
| 28 | 0 | 0 | 7.4 | 0 | 7.0 | | 3.2 |
| 32 | 0 | 0 | 4.9 | 0 | 3.0 | | 2.0 |
| 36 | 0 | 0 | 1.5 | 0 | 1.0 | | 0 |

Although it is preferred to incubate the second body fluid sample with the excess antigen or antibody prior to the addition of complement, it is possible to incubate the body fluid sample, excess antibody or antigen and complement in one operation; however, the results will not have as high a degree of accuracy as in the former case.

Generally, the amount of excess antigen added to the body fluid sample necessary to reverse anticomplementary activity was about 15 times the amount of optimum antigen necessary to interact with an optimum amount of antibody to form a complex capable of fixing 8 units of complement at an optimum ratio of antigen and antibody. The source of antigen was highly antigenic serum (titer, 1:>10,000 by the microtiter method described in Example 2) from patients with serum or infectious hepatitis, or from non-human primates, or antigen purified on CsCl gradients according to the method described in Barker et al., ibid.

The amount of antibody added to reverse anticomplementary activity was from 0.05 to 0.2 ml. of antibody solution per 0.4 ml. of mixture. The anticomplementary activity was determined both before and after incubation of the mixtures which were treated otherwise the same as those in which anticomplementary activity was reversed with excess antigen.

EXAMPLE 5

Serum samples were taken at weekly intervals from a patient who developed hepatitis after a transfusion. As shown in Table 4, the antigen content thereof was measured by agar-gel precipitation according to the method described above and by the quantitative complement-fixation method of the present invention described in Example 1. The CF (complement-fixation) titer is listed in Table 4 as the reciprocal maximum dilution of serum that fixed more than 2 units of complement in the presence of an optimum amount of antibody. Anticomplementary activity is expressed in Table 4 as the number of units of complement inactivated.

The anticomplementary activities of the sera alone were determined by adding 10 units of complement to 1:20 dilutions of the sera and incubating at 37° C. for 60 minutes. The amount of non-fixed complement remaining was determined according to the method described in Example 1. The amount of antigen added to reverse anticomplementary activity was 0.04 ml. of a serum sample containing an amount of antigen that titered 1:10,000 by the microtiter method described in Example 2. This serum was mixed with 0.04 ml. of the anticomplementary serum and incubated for 2 hours at 37° C., following which the mixture was titered for anticomplementary activity by As is apparent, it is a simple matter to calculate precisely the effect of anticomplementary activity on the determination of hepatitis-associated antigen according to the complement fixation method of the present invention.

What is claimed is:

1. A method of determining the degree of viral hepatitis associated anticomplementary activity in a body-fluid sample which comprises incubating a first body-fluid sample with a predetermined amount of complement for a period of time sufficient to fix at least a portion of said complement; determining the amount of complement remaining following said incubation; adding to a second body-fluid sample identical to said first body-fluid sample an excess of a member selected from the group consisting of Australia antigen and antibody thereto; incubating said second body-fluid sample containing said excess member with a predetermined amount of complement for a period of time sufficient to fix at least a portion of said complement; determining the amount of complement remaining following said incubation, and comparing said amount with the amount remaining following said incubation of said first body-fluid sample.

2. The method of claim 1 wherein said mixture of said second body fluid sample and said excess of said member is incubated for a period of time sufficient to reverse said anticomplementary activity prior to said step of incubating said mixture with said complement.

3. The method of claim 1 wherein said mixture of said second body fluid sample and said excess of said member is incubated for from about 1 hour to about 24 hours at a temperature of from about 4° C. to about 40° C.

4. The method of claim 1 wherein said excess member is antigen.

References Cited

Martin, Public Health Lab., vol. 20, 1962, pp. 34–37.

Shulman and Barker, Science, vol. 165, July 18, 1969, pp. 304–306.

Bolin, Transfusion, vol. 3, 1963 reprint, pp. 21–34.

Kabat, Exptl. Immunochem., C. C. Thomas, Springfield, Ill., 2nd Ed., 1961, pp. 133–142, 209–228.

Purcell, J. Inf. Dis., vol. 120, No. 3, September 1969, pp. 383–386.

ALBERT T. MEYERS, Primary Examiner

A. P. FAGELSON, Assistant Examiner

U.S. Cl. X.R.

424—13, 86, 89